No. 685,033. Patented Oct. 22, 1901.
B. F. DEAN.
CULTIVATOR.
(Application filed July 20, 1901.)
(No Model.) 2 Sheets—Sheet 2.
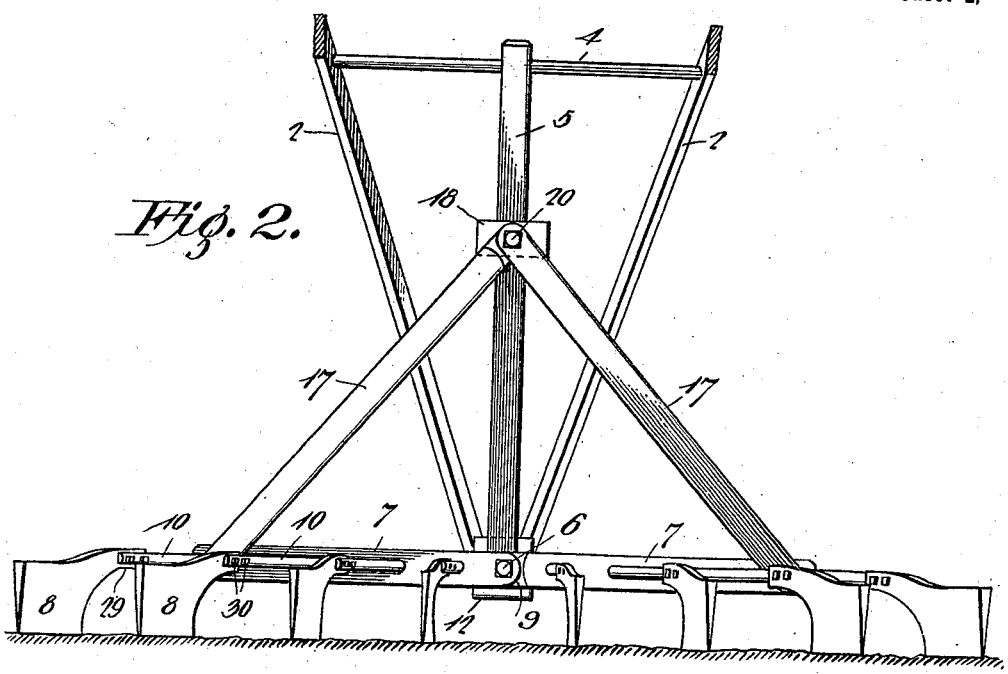
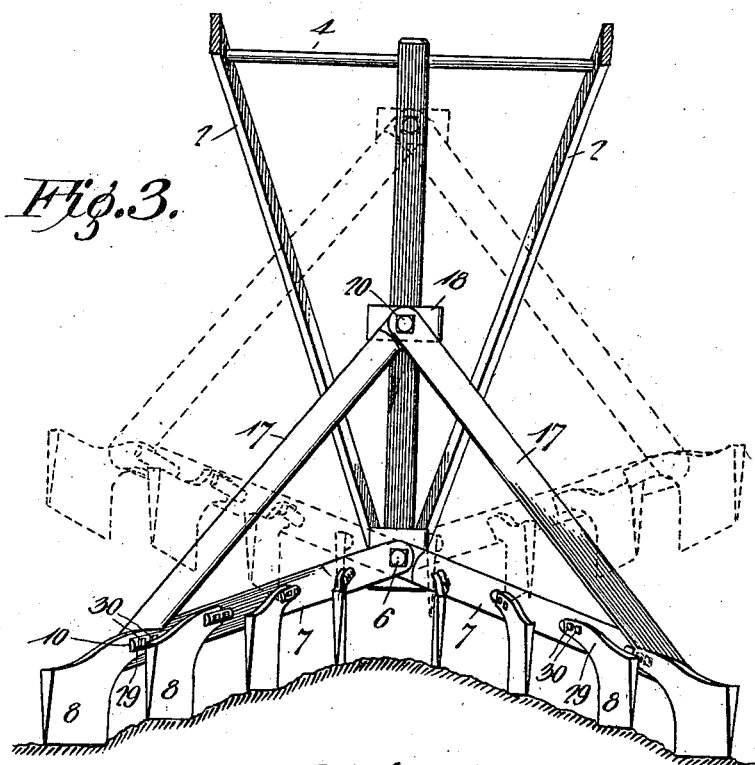
Witnesses
Benjamin F. Dean, Inventor.
by C. A. Snow & Co.
Attorneys

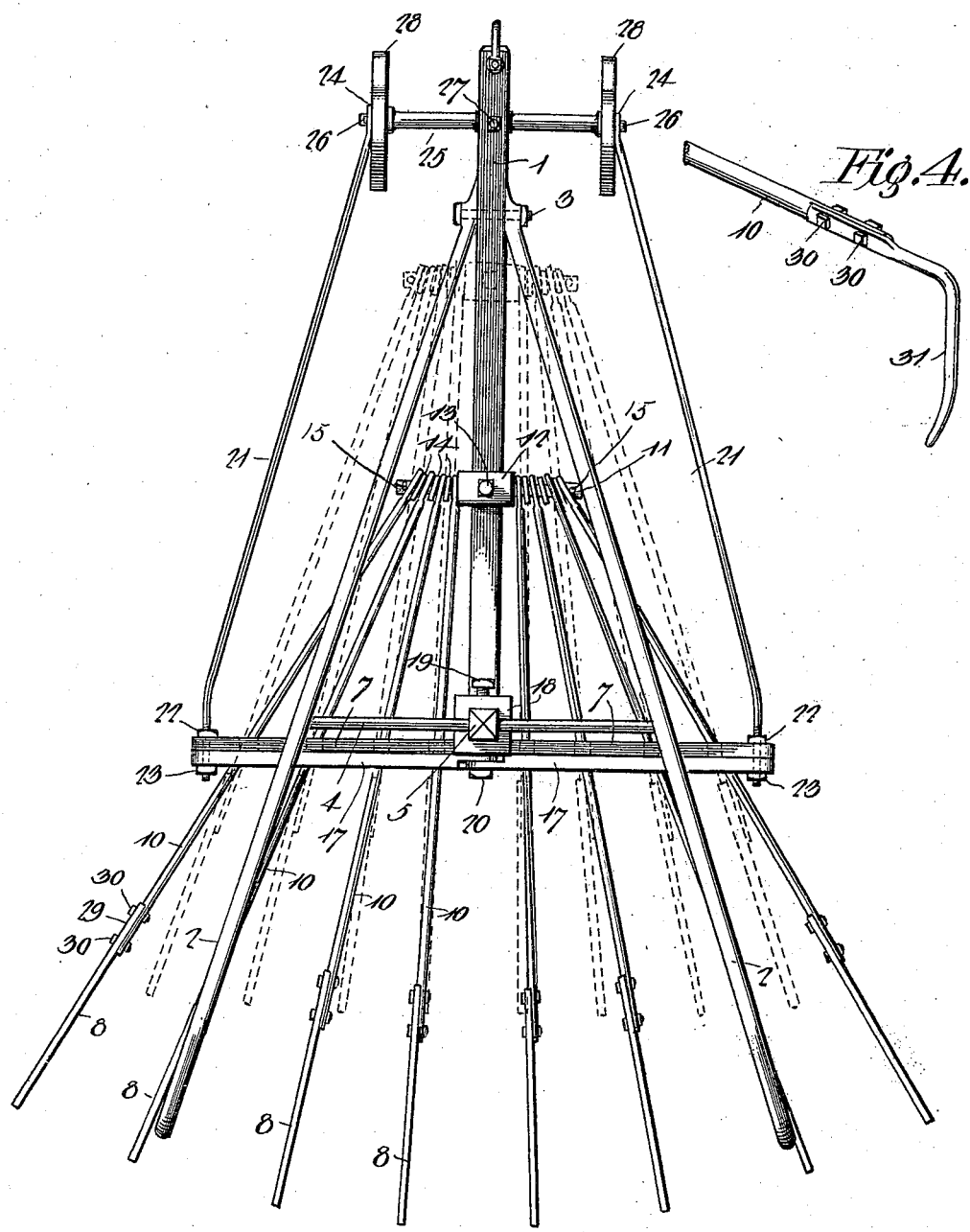

UNITED STATES PATENT OFFICE.

BENJAMIN FRANKLIN DEAN, OF OXFORD, NORTH CAROLINA.

CULTIVATOR.

SPECIFICATION forming part of Letters Patent No. 685,033, dated October 22, 1901.

Application filed July 20, 1901. Serial No. 69,127. (No model.)

*To all whom it may concern:*

Be it known that I, BENJAMIN FRANKLIN DEAN, a citizen of the United States, residing at Oxford, in the county of Granville and State of North Carolina, have invented a new and useful Cultivator, of which the following is a specification.

This invention relates to cultivators.

The object of the invention is to provide a simply-constructed, easily-operated, durable, and efficient form of cultivator in which provision shall be made for adjusting the knives or teeth thereof to conform to the land being cultivated—that is to say, whether for working on tops of beds, between beds, or on flat land—the construction and manner of assemblage of the parts for effecting the desired adjustments being such that change in the position of the parts may be easily and quickly performed.

A further object in to provide readily-operable means by which the space between the knives or teeth may easily be changed to adapt the cultivator for working different widths or rows of beds, the latter adjustment to be effected without interference with any previous adjustment of the knives or teeth to cause them to conform to the land to be worked, as above pointed out.

A further object is to provide simple and efficient means by which the cultivator may be held in proper operative position with relation to a bed being cultivated, the means employed serving to guide and give proper direction to the cultivator.

A final object is to provide means by which the cultivator shall be braced against any racking or disarrangement of its parts incident to contact with obstructions in operation.

The object first stated is attained by the provision of two pivoted levers supporting a plurality of radially-disposed arms carrying the knives or teeth, the arms being adjustable in two oppositely-disposed arcs of a circle of which the pivotal point of each lever is the center, suitable means being associated with the levers whereby they may be moved to and securely locked in any desired adjustment.

The object second stated is attained by assembling the knife-carrying arms with their supporting-levers in such manner as to permit the arms to slide therein and in associating the forward ends of the arms with a slidable block mounted on the frame-beam, said block carrying locking means for holding the knife-carrying arms at the desired adjustment.

The object third stated is attained by combining supporting-wheels with the forward portion of the frame-beam, the wheels to be spaced apart at such distance as to straddle the bed, and thus hold the cultivator in the proper position with relation to the bed.

The object last stated is attained by associating suitable brace-rods with the knife-arm-supporting levers and with the wheel-supporting axle, these rods to be adjustable, whereby any loosening of the cultivator-frame may be readily taken up, and thus keep the structure as a whole in rigid condition for use.

In the accompanying drawings, forming a part of this specification, and in which like numerals of reference indicate corresponding parts, I have illustrated a form of embodiment of my invention capable of carrying my ideas into effect, it being understood that the structure herein illustrated may have its parts varied or changed in actual practice and still be within the scope of my invention, and in the drawings—

Figure 1 is a view in plan exhibiting a cultivator constructed in accordance with my invention. Fig. 2 is a view in rear elevation, the handle-bars being in section, the view exhibiting the position occupied by the knives or teeth when operating on level ground. Fig. 3 is a view similar to Fig. 2, the position occupied by the knives or teeth in cultivating a bed being indicated in full lines and the position of the knives or teeth when cultivating between beds being indicated by dotted lines. Fig. 4 is a perspective detail view of one form of cultivator-tooth that may be employed in connection with the implement.

Referring to the drawings, 1 designates the frame-beam, the same in this instance being disposed in a horizontal plane, and has connected with it, near its front end, the usual handle-bars 2, a bolt 3, passing through the forward end of the handle-bars and through the frame-beam, serving to effect rigid connection between the parts at this point. The rear portions of the handle-bars are connected by a cross-rod 4, as usual, and as this will be well understood further description is deemed unnecessary.

Rigidly secured to the rear end of the frame-bar is a vertical upright or post 5, the upper portion of which is transversely orificed to receive the cross-bar 4, and by this arrangement not only is the post 5 securely braced at its point of connection with the cross-rod, but is also held in vertical position with relation to the frame-beam 1, this being essential in order to prevent any binding between the parts that effect the adjustment of the knives or teeth, as will presently appear. Pivotally associated with the frame-beams, in this instance by a bolt 6, are two levers 7, constituting the supports for knives 8, as clearly shown in Figs. 2 and 3, the overlapping ends of the levers being incut, as shown at 9 in Fig. 2, by which arrangement when the two levers are assembled their faces will be in alinement. Each of the levers 7 is provided with a plurality of openings to be engaged by the knife-arms 10, these arms, as shown in Fig. 1, being divergent or radially disposed from the front of the cultivator rearward, the forward end of the arms being provided with eyes or heads to engage bearings 11 of a sliding block 12, mounted on the frame-beam, said block carrying a locking-bolt 13, adapted to be turned into engagement with the frame-beam, and thereby hold the knives at the desired adjustment. To prevent interference between the forward ends of the arms 10 where they work on the bearings 11 of the sliding block 12, washers 14 are employed, and to permit ready separation of the arms 10 from the sliding block pins 15 are provided, which pass through the bearings of the sliding block and hold the knife-carrying arms in proper operative relation thereto. By moving the sliding block 12 back and forth upon the frame-beam the knives are diverged or contracted, thereby to adapt the cultivator for working different widths or rows of beds. Two adjustments of the knives are shown in Fig. 1, the extended position of the knives being indicated in full lines and the contracted position in dotted lines. But two adjustments are here shown, it being readily appreciable that the number of adjustments to be secured will be limited only by the length of the frame-bar between the points of attachment of the handle-bars and the post 5.

To effect adjustment of the knives to cause them to be operable for operating either on level ground, as shown in Fig. 2, over a bed, as shown in full lines in Fig. 3, or between beds, as shown in dotted lines in Fig. 3, two rods 17 are employed, the lower ends of which are pivotally connected with the outer ends of the knife-arm-supporting levers 7 and their upper ends with a sliding block 18, carried by the post 5, a bolt 19, carried by the block, serving to hold the same at the desired adjustment upon the post, and a bolt 20, passing through the upper ends of the levers and into the block, serving to hold the levers in proper operative relation with regard to the block. When it is desired to adjust the knives to cause them to conform to the surface to be cultivated, it will only be necessary to loosen the bolt 19 and move the block 18 up or down on the post 5, as the case may be, and when the desired adjustment has been effected to turn the bolt 19 into engagement with the post 5, and thereby firmly hold the knives in their adjusted position. It is to be understood that in changing the position of the knives or teeth to cause them to conform to the land to be cultivated this adjustment will not conflict with any previous adjustment of the knives to adapt them for working different widths or rows of beds, the two adjustments being separate and independent of each other.

The manner of assembling the knife-supporting levers with the rod 17 consists in this instance in passing through the outer ends of the rods and the levers two brace-rods 21, each of which carries two nuts 22 and 23, the nuts 22 bearing against the forward face of the knife-arm-supporting levers and the nuts 23 against the rear face of the rod 17. The forward ends of the brace-rods 21 are provided with heads 24, which fit over the outer ends of an axle 25 and are held associated therewith in this instance by pins 26, as clearly shown in Fig. 1. The axle 25 is secured to the frame-beam by a bolt 27 and carries two wheels 28, these wheels to straddle a row, and thus hold the cultivator in proper operative relation thereto, as before pointed out. The axle is to be rigid with relation to the frame-bar—that is to say, is to have no axial movement—and to effect this the employment of the brace-bars 21 is adopted. By reason of the two sets of nuts 22 and 23 on the brace-rods 21 these rods may be readily adjusted to take up any lost motion or looseness of the frame resulting from use, and, further, by adjusting these rods the wheels 28 will always be caused to run in a line parallel with the frame-bars.

Each of the knives or teeth 8 has a shank 29, through which is passed two bolts 30 to hold the shanks assembled with the arms 10, and by this arrangement should it be desired to remove the teeth 8 and attach cultivator-teeth 31 thereto, as shown in Fig. 4, this may be readily accomplished.

It is to be understood that this cultivator may be employed as a sulky-cultivator, to accomplish which it will be only necessary to remove the handle-bars and attach a seat to the post 5.

Having thus fully described my invention, what I claim as new, and desire to secure by Letters Patent, is—

1. A cultivator comprising a plurality of radially-disposed tooth-carrying arms pivotally aggrouped at their forward ends, and means for adjusting the arms to cause the knives or teeth to conform to the surface to be cultivated.

2. A cultivator comprising a plurality of radially-disposed tooth-carrying arms pivotally aggrouped at their forward ends, means coacting with the arms to effect either spreading or retraction thereof, and means for adjusting the arms through opposite arcs of a circle.

3. A cultivator comprising two pivoted levers supporting a plurality of radially-disposed tooth-carrying arms pivotally aggrouped at their forward ends and movable in opposite arcs of a circle of which the pivotal points of the levers are the center, and means for holding the said arms at any desired adjustment.

4. A cultivator comprising a plurality of radially-disposed tooth-carrying arms pivotally aggrouped at their forward ends upon a sliding support common to all of the arms, and means coacting with the rear portion of the arms to effect spreading or retraction thereof.

5. A cultivator comprising a plurality of radially-disposed tooth-carrying arms pivotally aggrouped at their forward ends, pivoted levers supporting the arms, and actuating means to effect movement of the extremities of the levers through two opposite arcs of a circle.

6. A cultivator comprising a plurality of radially-disposed tooth-carrying arms pivotally aggrouped at their forward ends, pivoted levers supporting the arms, actuating means to effect movement of the extremities of the levers through two opposite arcs of a circle, and locking means coacting with the lever-actuating means to hold the levers at the required adjustment.

7. A cultivator comprising a plurality of radially-disposed tooth-carrying arms, means for supporting said arms, and a slidable support with which all of the arms are associated in transverse alinement, movement of the slidable support in the direction of the length of the cultivator operating either to retract or spread the arms.

8. A cultivator comprising a horizontal frame-beam, a vertical post secured thereto, levers pivoted to the post, an adjustable block carried by the beam, tooth-carrying arms having a sliding connection with the levers and pivotally aggrouped in transverse alinement with the said block, an adjustable slide-block on the post, and connections between the latter slide-block and the levers.

9. A cultivator comprising a horizontal frame-beam supporting a transversely-disposed wheel-bearing axle at its front end and a vertical post at its rear end, levers pivoted to the post, an adjustable slide-block on the beam, tooth-carrying arms having a sliding connection with the levers and a pivotal connection with the slide-block, an adjustable slide-block on the post, connections between the latter slide-block and the levers, brace-rods having their rear ends passed through the said connections and the outer ends of the levers, and adjusting-nuts on the brace-rods for holding the parts assembled, the forward ends of the brace-rods being connected with the outer ends of the axle.

In testimony that I claim the foregoing as my own I have hereto affixed my signature in the presence of two witnesses.

BENJAMIN FRANKLIN DEAN.

Witnesses:
I. H. DAVIS,
F. P. HOBGOOD, Jr.